SIGNAL COMPARATOR HAVING DISTRIBUTED PLAYBACK HEADS

Filed March 22, 1968

INVENTOR.
EDWARD W. STARK
BY
S. C. Yeaton
ATTORNEY

United States Patent Office 3,518,650
Patented June 30, 1970

3,518,650
SIGNAL COMPARATOR HAVING DISTRIBUTED PLAYBACK HEADS

Edward W. Stark, Garden City, N.Y., assignor to Sperry Rand Corporation, a corporation of Delaware
Filed Mar. 22, 1968, Ser. No. 715,215
Int. Cl. G06f *15/34;* G11b *21/00, 5/02*
U.S. Cl. 340—174.1 1 Claim

ABSTRACT OF THE DISCLOSURE

A signal correlator having a magnetic recording material disposed annularly on a rotating disc. A recording head records incoming binary information on the magnetic material. Individual sensing elements are inductively coupled to the magnetic material and distributed uniformly around the annulus. The individual sensing elements are connected together so as to be in additive series relationship when energized in accordance with a desired code.

BACKGROUND OF THE INVENTION

The present invention relates to apparatus for examining electrical signal data and more specifically to apparatus for detecting correlation between a known function and an unknown time-varying function. Correlation devices are well-known in the prior art. In some of these devices, for instance, complex electronic correlation schemes are employed in which information would be analyzed in a stored memory system. The memory system is then interrogated by an electrical computation device for application to a computer.

In another prior art system, cross-correlation or autocorrelation functions are obtained by recording a signal on a magnetic recording element. Information is read out of the recording element by means of a semiconductor sensing element that is optically modulated by either an unknown or a known function. The output product represents a correlation function.

It is an object of the present invention to provide a correlation apparatus that is relatively simple, inexpensive and capable of economic packaging.

It is another object of the invention to provide apparatus for detecting and determining the position of the correlation peak of an $n$-level or analog signal which has been modified by fluctuations in amplitude or additive noise so that the desired signal has been suppressed.

SUMMARY OF THE INVENTION

The apparatus of the present invention detects the presence of a specific binary sequence in the midst of extraneous signals by recording individual bits of all received signals in successive areas of an elongated storage means and scanning this storage means with an array of sensing elements distributed and interconnected in accordance with a code corresponding to the specific signal.

DESCRIPTION OF THE PREFERRED EMBODIMENT

Figure 1:
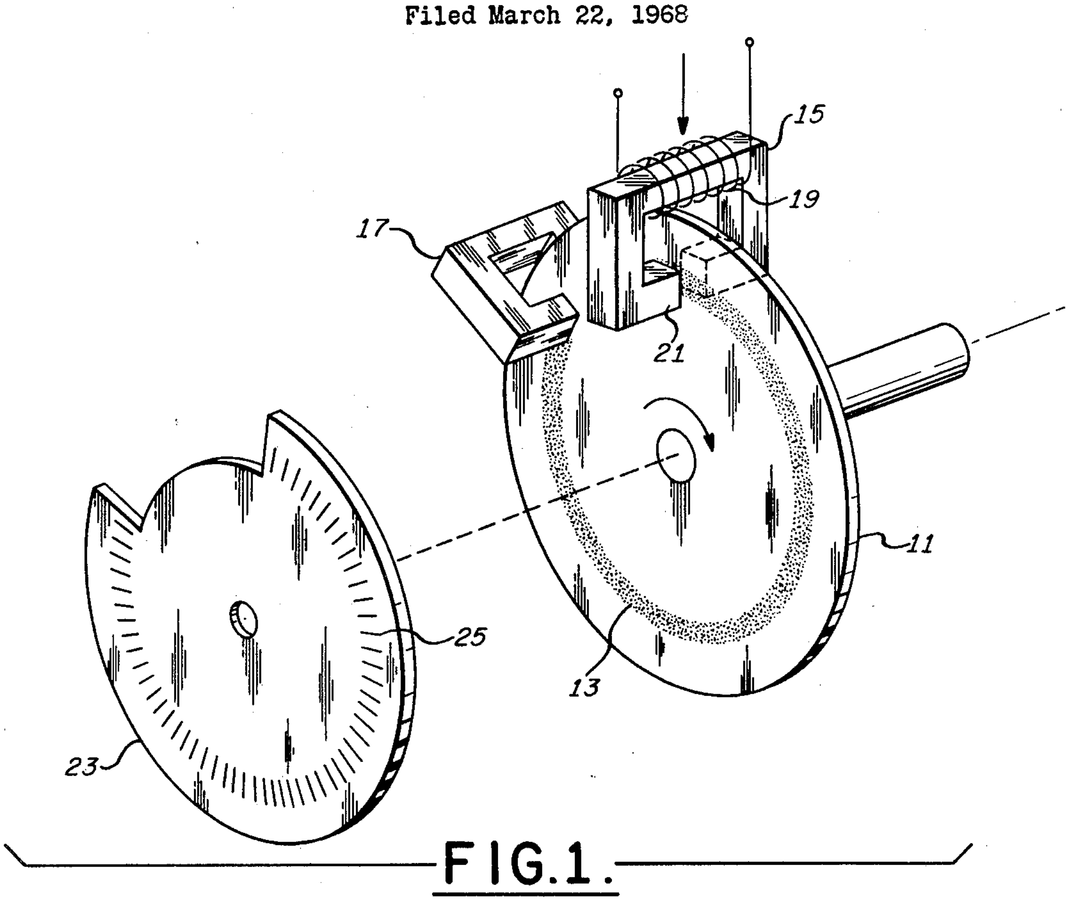
FIG. 1 is an exploded schematic diagram of a comparator constructed in accordance with the principles of the invention.

Referring now to FIG. 1, a rotatable disc 11 contains an annular track of magnetic material 13. Disposed along the edge of the disc is a first magnetic RECORD head 15 and a second ERASE head 17. Clockwise rotation of the disc causes the magnetic recording material in the track 13 to pass between the poles of the ERASE head so as to clear the magnetic material of any previously recorded information.

Although the RECORD and ERASE heads are shown with a considerable spacing as a matter of convenience, these heads ordinarily would be positioned close together.

In cases where a periodic code is to be used, the RECORD head preferably would occupy one bit position.

Another simplification may be made where periodic codes are to be employed in that the disc rotation may be synchronized with the period of the code. In this way, new signals may be recorded directly over the old signals. Separate erasure of the old signals is not necessary because the recording of a new signal partially erases the old signal during each period. In this situation, the ERASE head may be omitted.

Periodic codes and the location of the RECORD head may be chosen so that stray fields from the RECORD head will induce opposite polarity pulses in areas of the array of sensing elements on opposite sides of the RECORD head. This permits cancellation of the effect of these stray fields.

Any suitable high remanence material may be used for the recording track.

The backing material of the disc 11 may be made from a wide variety of materials. For some applications, a non-magnetic backing material may be preferred. On the other hand, a low remanence material such as soft iron may be used to decrease the reluctance of the flux paths so as to effectively provide a higher flux density in the air gap between the recording track and the sensing elements.

Incoming signal information is applied to the system through the winding 19 of the recording head 15. The recording head is oriented so that signals of one polarity establish a magnetic field across the pole pieces having a given orientation whereas signals of the opposite polarity cause a magnetic field of the opposite orientation to be established across the pole pieces.

Thus, for instance, a digital signal having a binary value of ONE might cause a current to flow in the winding 19 so as to establish a North magnetic pole at the pole piece 21. A bit having a binary value ZERO would cause the current to flow in the winding 19 such that the pole piece 21 would become the South pole of the field established across the pole pieces.

Because of the remanent field thus established in the magnetic material in a track 13, rotation of the disc 11 during the reception of a series of signals will produce a series of magnetic fields along the length of the track. These fields will be oriented perpendicular to the face of the disc 11 but individually polarized according to the polarity of the individual signal elements received by the correlator.

A stationary disc 23 is used as a playback head. This playback head carries an array of individual sensing elements 25. In practice, the playback head is positioned in close proximity with the rotating disc so as to provide inductive coupling between the magnetic material and the sensing elements.

As in the case of the disc 11, the backing material of the stationary disc 23 may be made of a non-magnetic material or a suitable low remanence material as desired. The disc 23 may be made from soft iron, for instance, and the individual sensing elements may be mounted in this backing material so as to be magnetically coupled but electrically insulated from the backing. As in the case of the recording track, the low remanence, high permeability backing decreases the reluctance of the magnetic path so as to increase the flux density across the air gap.

The sensing elements may, for instance, be comprised of individual lengths of conducting material disposed radially in the interface of the disc 23 and positioned over the magnetic track 13. These individual sensing elements are distributed around the axis of rotation of the disc 11. In the usual case, these individual sensing elements are distributed uniformly. However, a variable spacing may be preferred in situations where the pulse repetition rate of the signal to be correlated is a variable.

Although the presently preferred embodiment contemplates the use of a binary reference code, it will be obvious that multi-level reference codes can be accommodated by providing various levels of coupling between the connected elements and the magnetic material. The length of the individual sensing elements, for instance, may be adjusted to provide various output voltage levels. Similarly, different numbers of turns may be used in the various sensing element bit positions. In general, an *n*-level code will require a plurality of *n* different coupling levels.

The individual sensing elements are interconnected so that the voltages induced in each of these elements are arithmetically summed in order to provide a total output signal.

Figure 2:
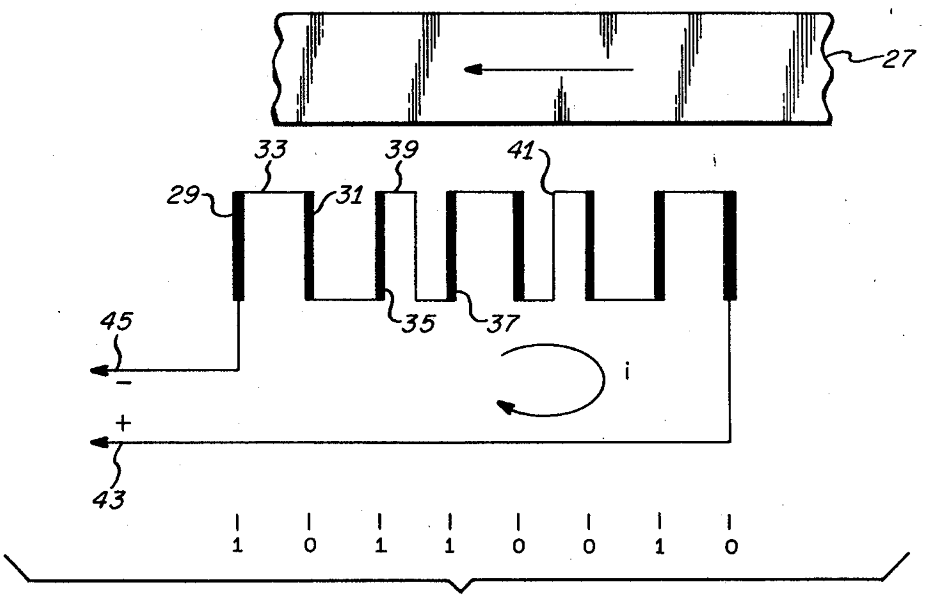
FIG. 2 is a diagram useful in explaining the operation of the device of FIG. 1.

The manner in which the individual induced voltages may be summed can be understood by referring to FIG. 2, which illustrates how a few of the sensing elements are arranged to detect a specific binary number.

Assume that it is desired to detect the presence of the number 10110010, that the recording material 27 is moved from right to left as indicated, and that it is desired to establish clockwise current flow through the circuit of FIG. 2.

The individual sensing elements such as the elements 29 and 31 are interconnected by means of conductors such as the conductor 33.

Assume now, that a recorded binary ONE sets up a magnetic field that induces an upwardly directed voltage in a sensing element and a recorded binary ZERO sets up a magnetic field that induces a downwardly directed voltage in a sensing element.

At the instant that the recording material moves into a position such that each of the magnetic fields corresponding to the desired number is directly beneath the appropriate sensing elements, maximum voltage will be induced in each element and the total of all of these voltages will also be a maximum.

Since the first digit is a binary ONE, an upward voltage will be induced in the sensing element 29. At the same instant, the second binary digit in the desired number, being a binary ZERO, will induce a downwardly directed voltage in the second sensing element 31. Because these two sensing elements are interconnected by the direct connection 33, however, the two voltages add and act to cause current flow in the desired clockwise direction.

The third and fourth digits of the desired number are both binary ONES and thus both induce upward voltages, in the appropriate sensing elements 35 and 37. These two elements are therefore interconnected by a cross-connector 39.

In the same manner, the fifth and sixth digits are both binary ZEROES and are therefore intoerconnected by the cross-connector 41.

In general, adjacent binary digits having the same binary value are cross-connected, whereas adjacent binary digits having the opposite binary value are directly connected.

The individual induced voltoages add up to produce a total output voltage at the terminals 43 and 45 having positive and negative potentials as indicated.

The connecting elements can be arranged to occupy a space remote from the recording medium or oriented so as to be effectively out of the field and thereofore not subject to an induced voltage. Thus, the connector 33 lies parallel to the motion of the magnetic fields so no voltages will be induced in this member. The vertical portion of the connector 39 can be formed on the outer face of the disc 23 so as to be substantially out of the fields.

Any extraneous signal received by the comparator will have a different combination of binary digits and will therefore produce a total output which is less than that produced by the desired signal. The magnitude of the total output signal therefore indicates whether a given signal is the desired signal or an extoraneous signal as well as the magnitude of the input signal.

In a typical comparator constructed in accordance with the principles of the invention, the individual sensing elements are formed by known printing methods. A typical playback head contains an array of approximately 8,000 sensing elements.

Many variations of the basic sensing elements and the connecting pattern are permissible within the scope of the invention. For example, the active length of the sensing elements can be made longer than the radial length of the magnetic gaps so that the direct connecting members lie well outside the RECORDING and ERASE fields.

Although the basic connecting scheme shown in FIG. 2 provides a simple pattern, it may be desired to use other connecting patterns in some applications.

If printed circuit techniques are used for example, it would be desirable to print all of the connecting elements as well as the sensing elements on the inner face of the stationary disc 23.

In this situation, it is possible first to provide sensing elements having a radial length longer than the magnetic air gaps and then provide arcuate connecting buses inside and outside the ring of sensing elements to connect selected sensing elements.

Thus, a given arcuate bus may be used to interconnect two oppositely polarized sensing elements even though these elements are not adjacent each other. Thus, in a situation in which two adjacent sensing elements have the same polarity, the first of these adjacent elements may be connected by an arcuate bus to a third element having the opposite polarity. The intermediate sensing element may then be connected to still another sensing element by a second arcuate bus. In this way, the entire array of sensing elements can be connected serially even though their order in the electrical series is not the same as their order of placement on the disc. In other words, the connection might, for instance, permit current to flow through the first sensing element, then through the third, the fourth and the second element, in that order. Since the output signal is the sum of all of the induced voltages, the order of connecting the elements does not affect the total output signal.

By using patterns of arcuate buses in this fashion, it is possible to eliminate cross-connections and yet provide a single layer pattern that might be printed entirely on the inside surface of the stationary disc.

It will also be appreciated that although the presently preferred embodiment contemplates the use of a single conductor for each sensing element, multiple series-connected conductors can be used if desired.

In some instances, it may be desirable to provide closely spaced slots for the sensing element and wire these elements in the fashion of a motor armature. One or more windings may then be used for a binary ONE sensor and another winding or windings may be used for the binary ZERO sensor.

The speed at which the disc 11 is rotated is determined by the pulse repetition rate of the desired incoming signal and the spacing between the individual sensing elements.

If desired, a clock track may be added to the disc carrying the recording track. The clock track may be used to provide synchronizing signals for the entire system.

It will be understood that although the presently preferred embodiment utilizes a magnetic material on a rotating disc, various modifications of this particular structure may be employed where desired. In some instances, a rotating drum may be preferred to the disc 11. In other instances, a loop or a sufficiently long strip of magnetic tape might be employed.

Although the invention has been described as a magnetic system, a variety of recording and sensing media may be used within the scope of the invention.

For instance, known electrostatic or optical devices may be used in practicing the invention. Photochromic material, for instance, may be used as a recording medium and known types of photo-responsive means may be used for the individual sensing elements. In some instances, it may be desirable to bias the light source or photo-responsive means in order to provide *n*-level responses.

More than one recording track can be used on a given disc if desired. Thus, a plurality of concentric tracks may be used and a recording head operated for each track. Alternatively, a single recording track may be used with a plurality of recording means spaced around the periphery of the track.

It will be appreciated that the embodiment of FIG. 1 utilizes a rotating recording track as a matter of convenience. In some instances, it may be desired to provide a stationary track and to move the magnetic heads and the playback head to provide the relative motion.

It will be noticed that since apparatus embodying the principles of the present invention produces an output signal that is the sum of the voltages induced in all of the sensing elements, variations in the efficiency of the individual sensing heads are averaged out. The output signal, being the sum of many individual voltages, therefore represents a substantial signal level. This effectively provides a high signal-to-noise ratio. Furthermore, the system tends to overcome low frequency disturbances by averaging out mechanical inaccuracies.

Since many codes have approximately equal numbers of positive and negative bits, the effect of extraneous fields such as the earth's magnetic field tends to cancel out.

While the invention has been described in its preferred embodiment, it is to be understood that the words which have been used are words of description rather than limitation and that changes within the purview of the appended claim may be made without departing from the true scope and spirit of the invention in its broader aspects.

I claim:

1. Apparatus for providing an output voltage having a maximum value in response to the reception of a specific binary coded sequence in the midst of extraneous received signals, said apparatus, a rotatable disc, a face on said disc, a track of magnetic material disposed annularly on said face, a magnetic recording head connected to receive incoming signals, a pair of pole pieces on said recording head, said recording head being disposed so that a magnetic field established between said pole pieces is oriented perpendicularly with respect to the face of said disc in the region of said annular track, a stationary playback head positioned adjacent said face, an array of identical individual sensing elements on said playback head, said array including an individual sensing element corresponding to each digit in the binary signal to be detected, each of said sensing elements including a length of conducting material disposed radially on said playback head and positioned over said track so as to be inductively coupled thereto, and summing means serially interconnecting said sensing elements, said summing means including conductors arranged to cross-connect those adjacent sensing elements corresponding to adjacent binary digits in said coded signal having the same binary value and to connect directly those adjacent sensing elements corresponding to adjacent binary digits in said coded signal having the opposite binary value.

References Cited

UNITED STATES PATENTS

| | | | |
|---|---|---|---|
| 2,770,796 | 11/1956 | Boer | 340—174.1 X |
| 2,836,359 | 5/1958 | Mazzagatti | 235—181 X |
| 3,174,142 | 3/1965 | Mallinckrodt | 235—181 X |
| 3,199,106 | 8/1965 | Karr | 235—181 X |
| 3,258,750 | 6/1966 | Shew | 340—174.1 |
| 3,371,196 | 2/1968 | Lerwill et al. | 235—181 |
| 3,401,268 | 9/1968 | Lea | 235—181 X |

MALCOLM A. MORRISON, Primary Examiner

F. D. GRUBER, Assistant Examiner

U.S. Cl. X.R.

235—181, 177